United States Patent [19]
Futagi

[11] Patent Number: 5,787,675
[45] Date of Patent: Aug. 4, 1998

[54] METHOD OF ASSEMBLING LOG WALLS FOR LOG HOUSE AND CLAMPING BOLT TO COUPLE THE WALL

[76] Inventor: Kohzoh Futagi, C/O R.C.Core Co.,Ltd., 6-11, Nanpeidai-cho, Shibuya-ku,Tokyo, Japan

[21] Appl. No.: 720,747

[22] Filed: Oct. 1, 1996

[30] Foreign Application Priority Data

Feb. 5, 1996 [JP] Japan .................................. 8-042077

[51] Int. Cl.⁶ .................................................. E04B 1/10
[52] U.S. Cl. .................... 52/745.1; 411/389; 52/223.7; 52/285.1; 52/285.4; 52/233
[58] Field of Search .................... 52/233, 745.1, 52/745.19, 223.7, 285.1, 285.2, 285.4; 411/388, 389, 397, 401

[56] References Cited

U.S. PATENT DOCUMENTS

| | | | |
|---|---|---|---|
| 824,983 | 7/1906 | Farrington | 411/397 X |
| 4,126,977 | 11/1978 | Chisum | 52/233 |
| 4,147,000 | 4/1979 | Lewandowski . | |
| 4,356,676 | 11/1982 | Hauptman | 52/233 X |
| 4,503,648 | 3/1985 | Mahaffey | 52/233 X |
| 4,636,125 | 1/1987 | Burgard . | |
| 4,688,362 | 8/1987 | Pedersen et al. | 52/233 X |
| 4,823,528 | 4/1989 | Fan | 52/433 |
| 4,909,012 | 3/1990 | Thompson, Jr. | 52/233 X |
| 4,928,531 | 5/1990 | Schult et al. . | |
| 5,163,259 | 11/1992 | Hunsaker et al. | 52/233 |
| 5,253,458 | 10/1993 | Christian | 52/233 |
| 5,283,994 | 2/1994 | Callison | 52/233 X |
| 5,358,367 | 10/1994 | Yang | 411/389 X |
| 5,400,845 | 3/1995 | Choiniere et al. | 52/233 X |
| 5,542,787 | 8/1996 | Charlanow | 52/233 X |
| 5,577,356 | 11/1996 | Hubbard et al. | 52/233 |
| 5,637,033 | 6/1997 | Williams | 411/389 X |

FOREIGN PATENT DOCUMENTS

| | | | |
|---|---|---|---|
| 0 584659 A | 8/1993 | European Pat. Off. . | |
| 3234870 | 2/1984 | Germany | 52/233 |
| 40 11 066 A | 10/1990 | Germany . | |
| 642130 | 7/1962 | Italy | 411/397 |

Primary Examiner—Wynn E. Wood
Attorney, Agent, or Firm—Ronald R. Snider

[57] ABSTRACT

A first story log house material is adhered to a base with a coach bolt and succeeding log materials after a second story are piled up in turn with clamping bolts. A coach bolt or a clamping bolt has a height corresponding with one long thickness and is equipped with a nut portion and a wahser. This method of assembling log walls for the log house eliminates the accumulated shrinkage for the log wall during the drying period. Thus, by the present invention, it is now not necessary to prepare some large size of a side adjusting device and also to reserve some large settling space, both of which are unavoidable in prior art.

17 Claims, 11 Drawing Sheets

Fig. 3
Fig. 4
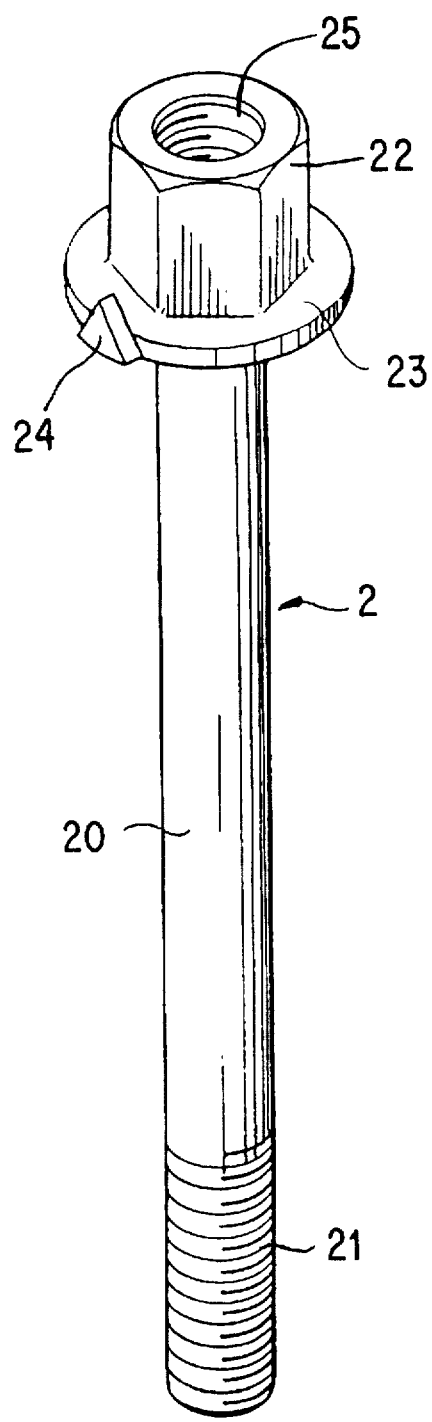
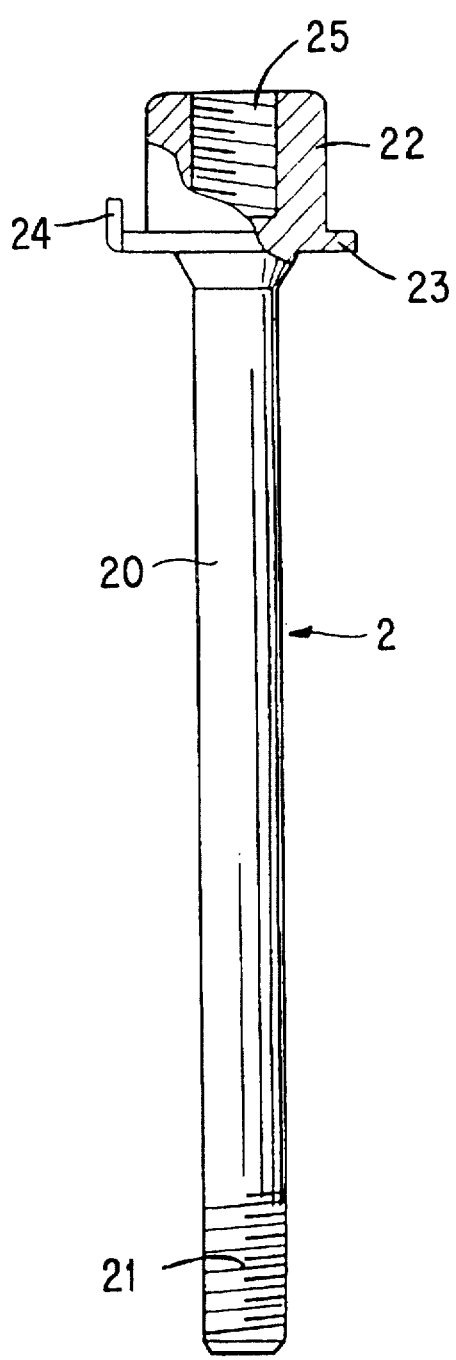

Fig. 8
Fig. 9
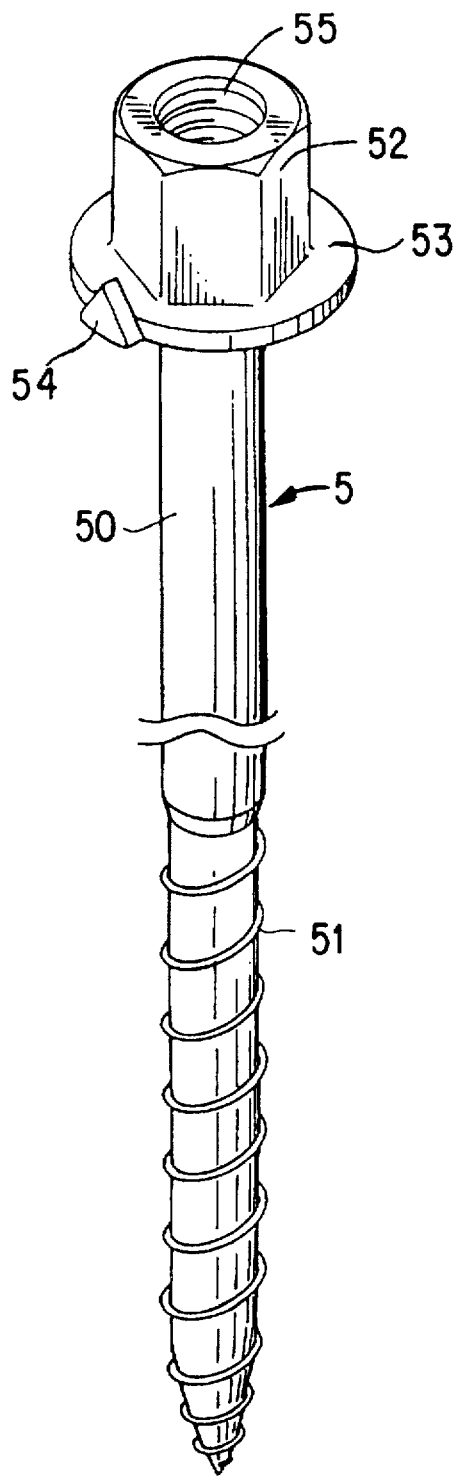
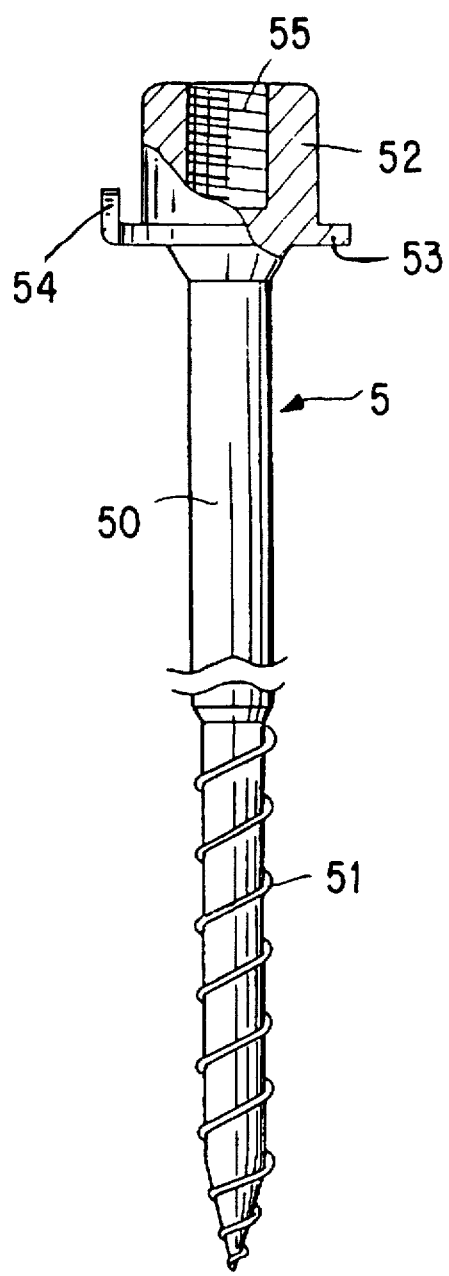

METHOD OF ASSEMBLING LOG WALLS FOR LOG HOUSE AND CLAMPING BOLT TO COUPLE THE WALL

BACKGROUND OF THE INVENTION

In prior art, log walls constituting the wall for a log house are assembled by a single and long bolt running through all log walls, while a wood dowel is inserted into the each log wall. A first story log is firmly coupled with a foundation base by a coach bolt. Log material to be used for the log house has an inferior dryness in comparison with general architectural lumber. Although drying degree is dependent upon the climate or season of building sites, the material tends to incur some shrinkage toward drying period, and thus the height of the log wall becomes lower unavoidably after the accumulation of the shrinkage imposed over each log wall. For examples, the log material is said in general to have its liquid water content at from 19% to 30%, and therefore the material is to shrink itself from 1.5% to 4% in the due course. According to this theory, in the case where 15 logs, each log 178 mm in height, are piled up to produce a log wall, this wall is predicted to decrease its total height from 40 mm to 107 mm after treated with drying procedure. On the other hand, even if we use the material of laminated wood which is treated with considerably high dryness and with low shrinkage ratio, it is still unavoidable to incur 0.2% shrinkage. Thus, when we adopt this laminated material to produce the log wall in 15 piles in the same manner as described above, the height of the wall decreases at 5.3 mm in total.

The unavoidable shrinkage of the log material, as explained so far, has caused various problems for log house building. For instance, partition walls, stairs and room fittings, all of which incur almost no shrinkage, are to be equipped in the log house. Therefore, when interior structures are installed within the log walls, an allowance has to be made for the eventual discrepancy in height of the log wall after shrinkage occurs. Then, a side adjusting device in some large size is adopted so that the difference may be absorbed properly. At the same time, in order to absorb the expected maximum shrinkage, a considerable gap, what we call "a settling space", must be reserved between the equipped interior structures in the first floor and the second floor. It is quite troublesome work for log house builders to adopt such a large size side adjusting device and to reserve some large size of the settling space, and therefore some good means of solution is needed.

SUMMARY OF THE INVENTION

This invention, therefore, has an object to provide a means wherein the adoption of the large side adjusting device and the reservation of the large settling space are both avoided by eliminating the defect where the height of the log wall is decreased by the drying progress of the log material.

In order to solve the problem, the present invention has developed the following means. In a method of assembling the log walls wherein a first log material is adhered to the base by a coach bolt and succeeding log materials after a second log material are piled neatly up in turn with a clamping bolt, the coach bolt and the clamping bolt have the height corresponding with that of one log material, and these two bolts have bolt portions which are threaded in wood screw or normal screw toward their bottom parts. At the top part of the bolt portion, a nut portion is built and also a washer is also established between the bolt portion and the nut portion. All these three parts, the bolt portion, the nut portion and the washer are formed as one body. A bolt insertion hole is drilled in the log material, into which the clamping bolt or the coach bolt is inserted, and then the bolt portion is screwed into the nut portion and through this continuous screwing the log material is coupled one after another at the required height. While the screwing procedure is repeated, the washer works to accept the upper log material above and at the same time to bind tightly the lower log material below.

A sealing tape is also furnished between each log material while a caulking compound is extended thereover, and thus the tight coupling of each log material is obtained where the clamping bolt clamps the log material to press down the sealing tape.

When a gap exists between the bolt portion and the bolt insertion hole, the gap may invite buckling of the bolt by considerable shrinkage of the log material or by unexpected external shock, and the log house may meet some bad influence thereof because the weight of the log wall is supported only by the clamping bolt. In order to avoid this influence, it is necessary to provide some prevention means in the gap so that the means prevent the bolt from being buckled. As this prevention means, the present invention has adopted the following constitutions. First, the bolt portion is formed in a larger diameter and it closely fits into the bolt insertion hole so that existing gap is eliminated. As a second constitution, a filler is supplied into the gap to eliminate it. The material of the filler is now selected from sand or cylindrical pad. As a further constitution, the invention provides a separate prevention plate, and the plate is mounted around the bolt portion to eliminate the gap.

Further, the washer is equipped with an extra claw which pierces and holds tightly the bottom surface of the log material above, and this claw prevents synchronous rotation of the bolt effected in lower log material when the bolt effected in the upper log material is rotated.

Further, a bolt portion in screwed condition is formed in its height corresponding to that of a log material and on the top of the bolt portion a nut portion is formed as one body, and between the bolt portion and the nut portion a washer is formed also as one body and the diameter of the washer is larger than that of a bolt insertion hole, while said bolt portion and nut portion is threaded at exactly corresponding screw connection.

Further, a bolt portion in wood screwed condition is formed in its height corresponding to that of a log material and on the top of the bolt portion a nut portion is formed as one body, and between the bolt portion and the nut portion a washer is formed also as one body and the diameter of the washer is larger than that of a bolt insertion hole, while said bolt portion and nut portion is threaded at exactly corresponding screw connection.

BRIEF DESCRIPTIONS OF DRAWINGS

FIG. 3 is a perspective view of the clamping bolt.

FIG. 4 is a sectional view of the above FIG. 3.

FIG. 8 is a perspective view of the coach bolt.

FIG. 9 is a sectional view of the above FIG. 8.

DETAILED DESCRIPTION OF PREFERRED EMBODIMENTS

Figure 5:
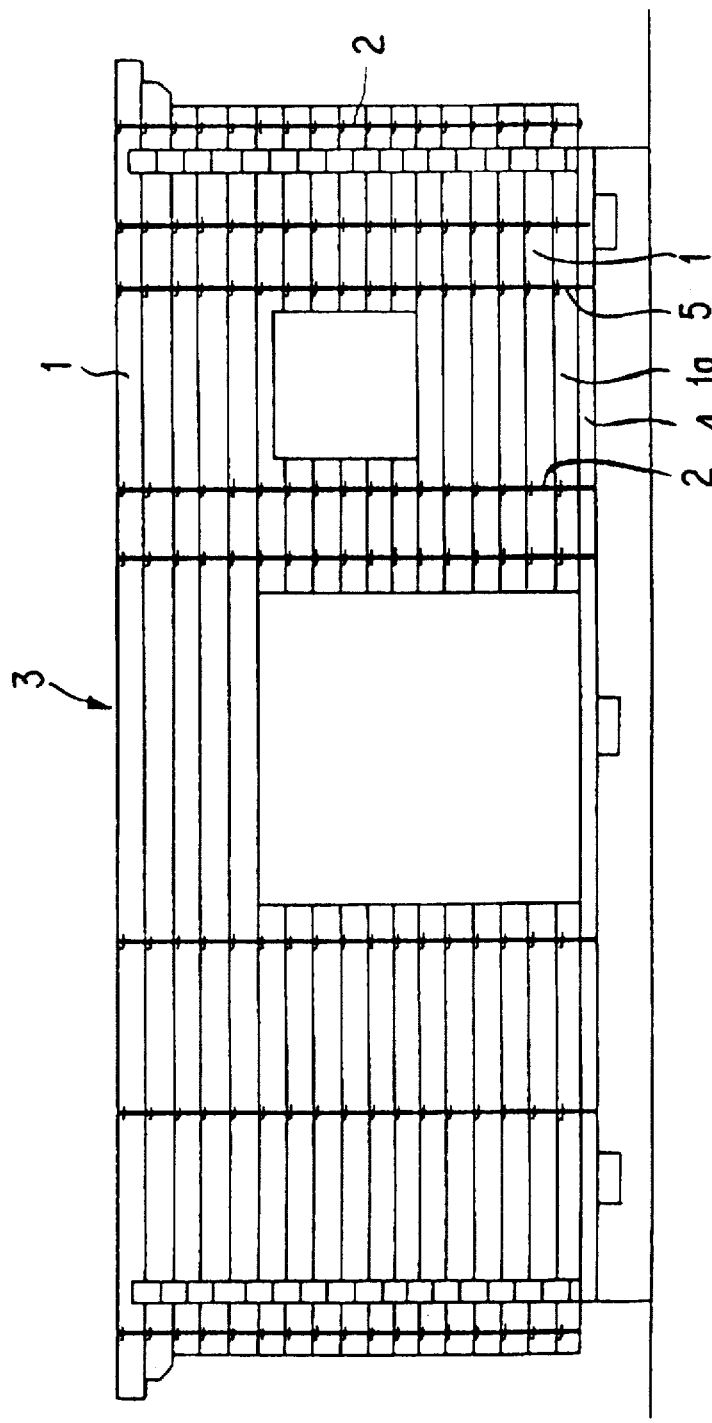
FIG. 5 is a schematic view to show the piled up log walls.

It is now explained for preferred embodiments of this invention as follows. In the drawings, the numeral (1) indicates a log material which constitutes a wall of a log house, and required number of log materials are coupled together to produce the wall for the log house. With reference to FIG. 5, a log wall (3) is completed by the close coupling of the log material (1) with a clamping bolt (2). The log material (1) shown on the drawings is a laminated wood, but as a matter of course, a raw log material can be adopted as the material.

With reference to FIG. 3 and FIG. 4, the clamping bolt (2) has its height corresponding to the height of the log material (1). Toward the bottom of the bolt (2) a bolt portion (20) is established with a male screw (21) threaded, while on the top of the bolt portion (20) a nut portion (22) is formed. Between the bolt portion (20) and the nut portion (22) a washer (23) is built. These three parts, the bolt portion (20), the nut portion (22) and the washer (23), are built as one body in the clamping bolt (2). On the washer (23) a claw (24) is mounted to pierce into the surface of the log material (1) above so that the further rotation of the clamping bolt (2) in the lower section is prevented. In the nut portion (22) a female screw (25) is threaded to receive the fixing of the male screw (21) therein, and thus the clamping bolt (2) is united from one after another under the work of fixing the bolt portion (20) into the nut portion (22) correctly. In this embodiment, the bolt portion (20) and the nut portion (22) are constituted as one body, but it is also available to produce these two portions separately and they may be combined together by means of welding or other methods in the later stage. With regard to the log material (1), in case if the final top material is sometimes adopted in the half size of the height, the height of the bolt (2) should be adjusted accordingly in advance. At the same time, the clamping bolt (2) to be used in the final top material does not need any nut portion at all, since further loading is not necessary at all.

Figure 1:
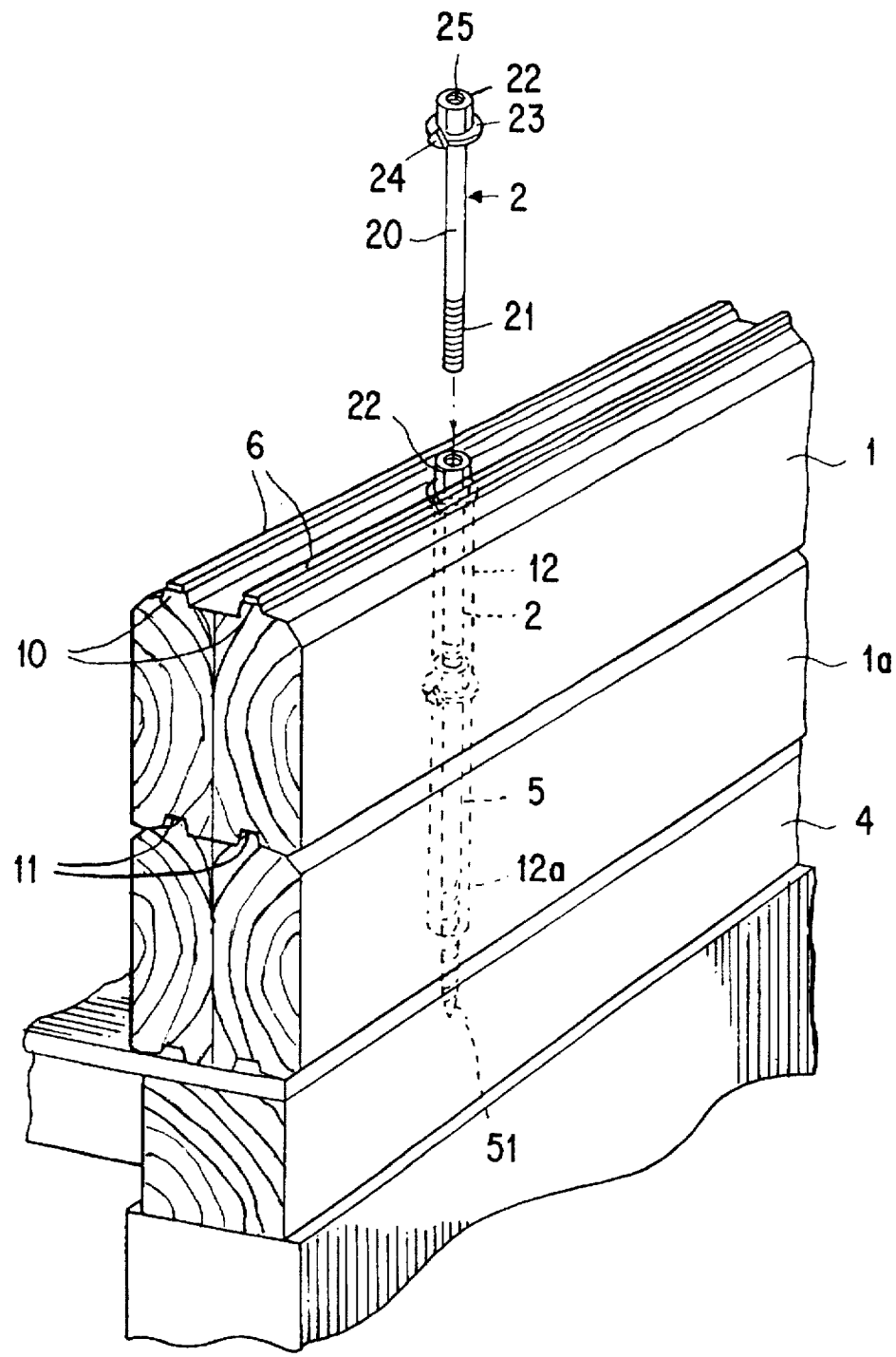
FIG. 1 is a perspective view to show couplings of log walls by a clamping bolt developed by the present invention.
Figure 2:
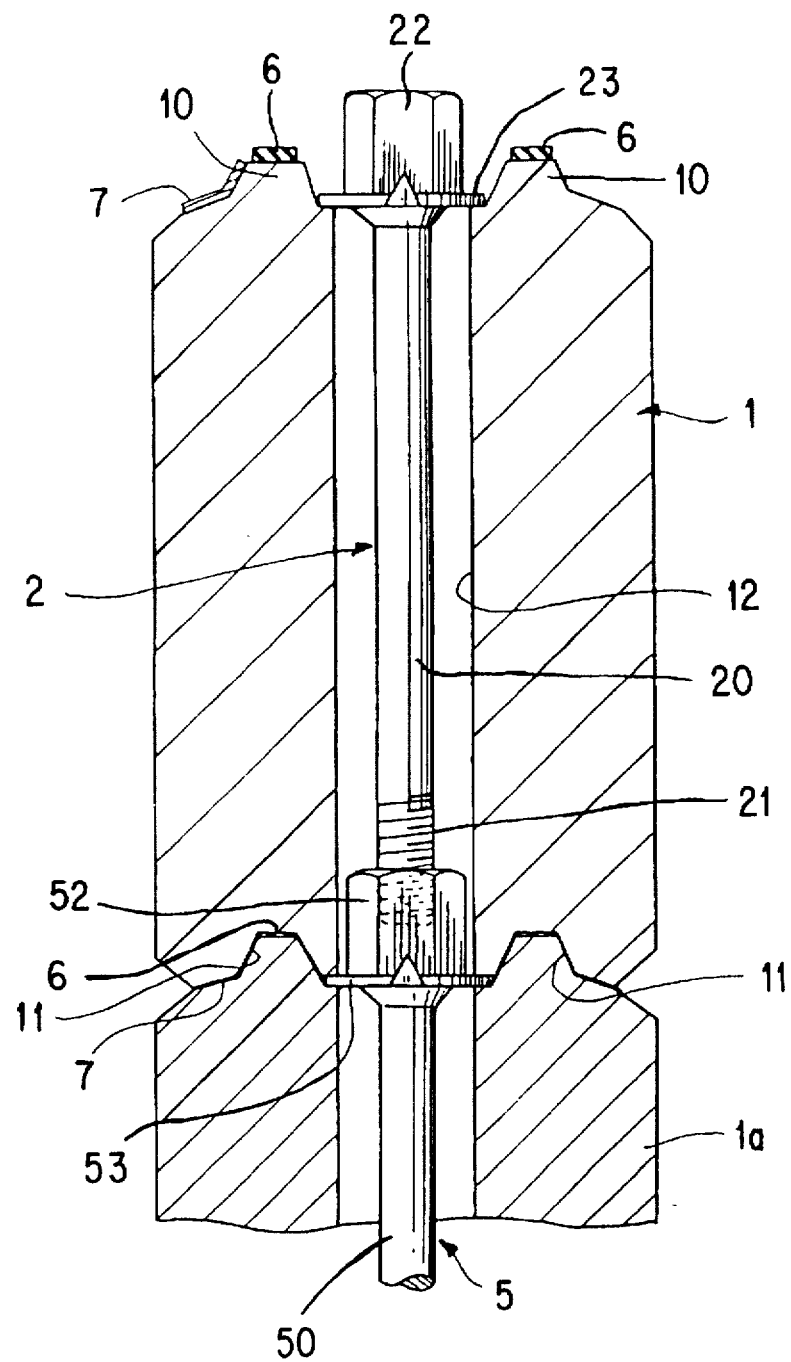
FIG. 2 is a cross-sectional view of the above FIG. 1.
Figure 6:
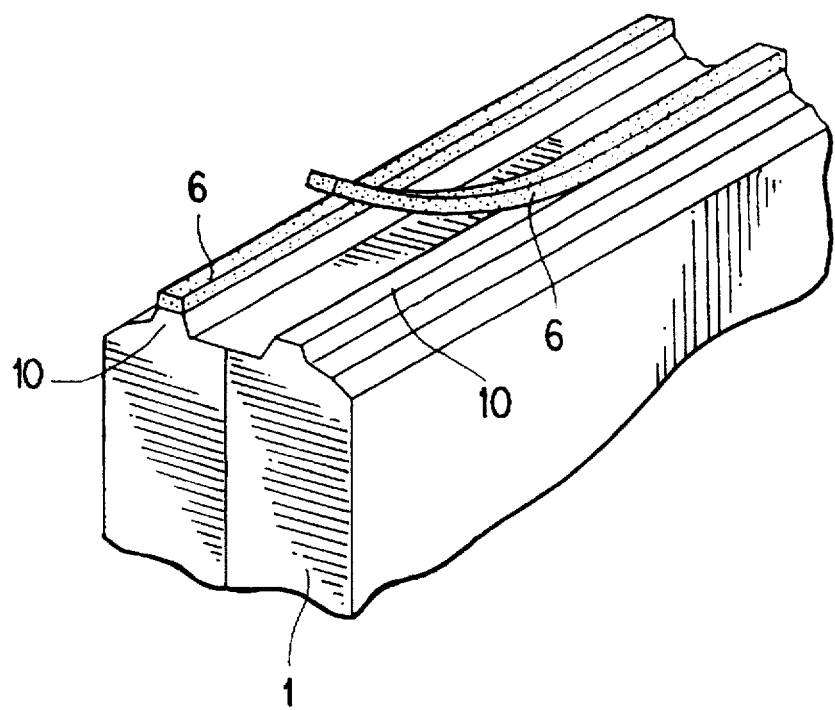
FIG. 6 is a perspective view of a sealing tape attachment.

With reference to FIG. 1, FIG. 2 and FIG. 6, on the top surface of the log material (1) two tongues (10) in the form of long and slender protuberance are formed longwise in parallel with some distance therebetween, while on the bottom surface two corresponding ditches (11) are formed to receive the tongues (10). A bolt insertion hole (12) is drilled through perpendicularly just between the two tongues (10). The nut portion (22) of the clamping bolt (2) can be inserted into the bolt insertion hole (12), and the hole (12) has a little bit smaller diameter than that of the washer (23). Proper numbers of the hole (12) are drilled through in the log material (1) longwise. Thus, when the log material (1) is coupled, the washer (23) presses downward to clamp the lower log material tightly while it receives the upper log material correctly. With regard to a shape of the tongue (10), the formation is not restricted in this embodiment at all, and the number is also not only restricted at two tongues as mentioned in this embodiment.

Figure 7:
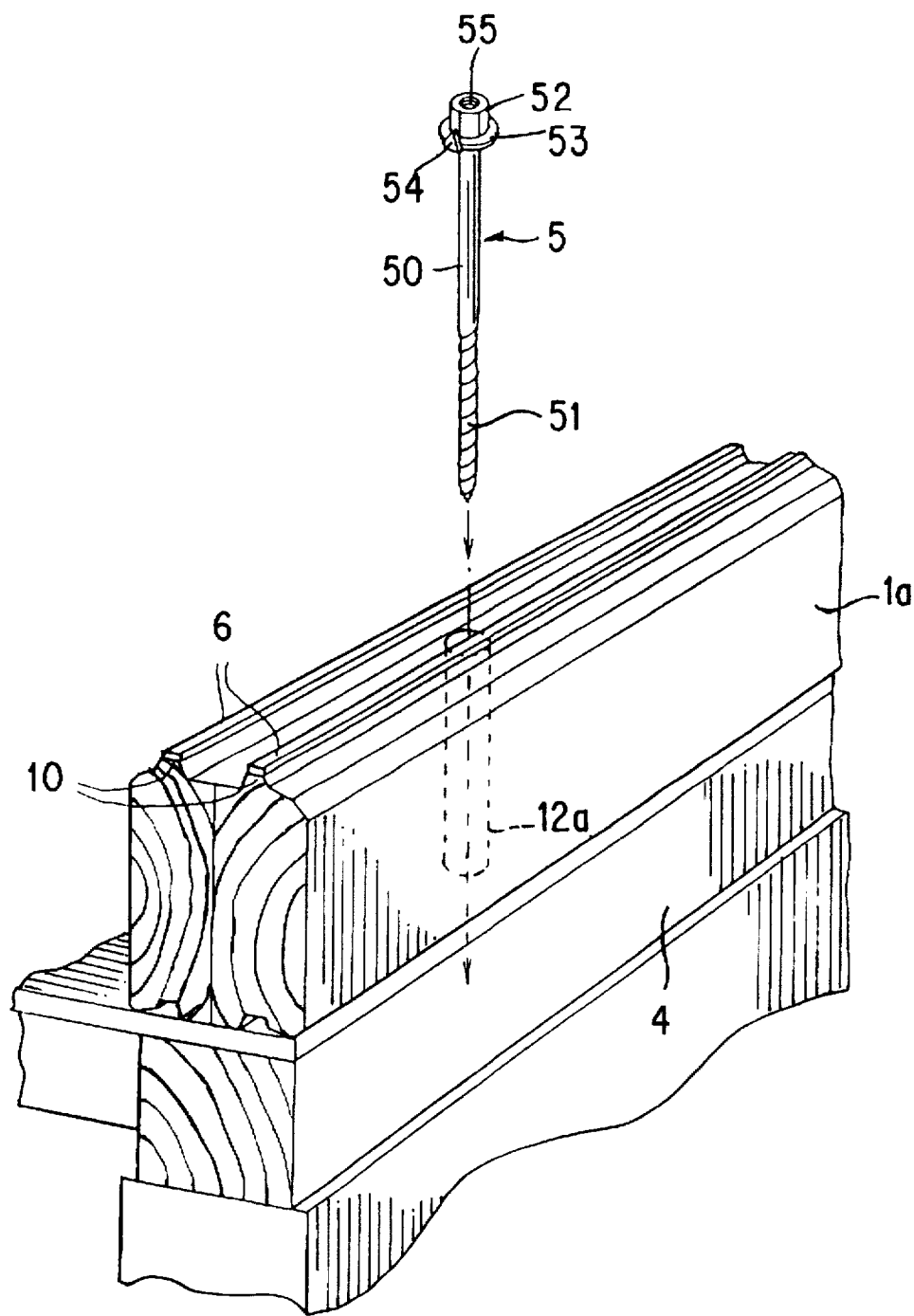
FIG. 7 is a perspective view to show coupling of a coach bolt.

Referring to FIG. 7, the first story log material (1a) to be located on the base (4) is coupled by a coach bolt (5). As shown in FIG. 8 and FIG. 9, the coach bolt (5) has a slight difference with the clamping bolt (2) where the bolt portion is constituted with a wood screw (51), while all features are almost same to the clamping bolt (2). The coach bolt (5) has its height corresponding to the height of the log material (1a). Toward the bottom of the bolt (5) a bolt portion (50) is established with a wood screw (21) threaded, while on the top of the bolt portion (50) a nut portion (52) is formed. Between the bolt portion (50) and the nut portion (52) a washer (53) is built. On the washer (53) a claw (54) is mounted to pierce into the bottom surface of the second story log material (1) so that the further rotation of the coach bolt (5) is prevented. In the nut portion (52) a female screw (55) is threaded to receive the fixing of the male screw (21) therein, and thus the clamping bolt (2) is united on the top of the coach bolt (5) under the work of fixing the bolt portion (20) into the nut portion (52) correctly. As the first story log material (1a), the half size of height is sometimes adopted, and in this case, the proper height of the coach bolt (5) should be also prepared accordingly.

In order to establish the log wall, the first story log material (1a) is placed on the base (4), and the coach bolt (5) is inserted into the bolt insertion hole (12a), and then the wood screw (51) is screwed into the base (4) and is confirmed the fixed coupling thereof. After the first story log material (1a) is fixed, a sealing tape (6) is affixed on a tongue (10) and a caulking compound is extended over an outer surface of the log material (1a). Then, the second story log material (1) is placed on the first story log material (1a), and the clamping bolt (2) is inserted into the bolt insertion hole (12), and the male screw (21) of the clamping bolt (2) is screwed into the female screw (55) of the coach bolt (5) and thus the fixed coupling of the two materials (1a and 1) is confirmed. Now, in the same process, the third story log material is placed on the second log material and these two log materials are confirmed for tight coupling. Before this coupling process, the sealing tape (6) and the caulking compound (7) must be furnished on the second story log material in the same method as described above. As explained, the required log materials are piled up one after another until the final story log material to provide the log wall thereby. The sealing tape (6) existing between each log material is pressed down effectively by the tight screwing of the clamping bolt (2), whereas the gap between each log material is eliminated. Accordingly, each log material is closely adhered each other just after these couplings are finished.

After the log house is built, the log materials (1a, 1) become shrunk by drying. When the log material becomes dry and shrunk, the lower surface of each log material is received and supported by the washer (23,53) of the clamping bolt (2) or the coach bolt (52). Therefore, the shrinkage effect is only imposed on a single log material, which can avoid the accumulating gaps of total log materials to be adopted for the wall building in prior art. As a result, the maximum shrinkage of the log wall is equal to that of a single log material, whereby it is quite enough to prepare a side adjusting device to absorb only the shrinkage of the single log material and to prepare a settling space reserving the space caused by the shrinkage of the single log material.

In case if some large shrinkage is invited for the log material because of limited drying period, the gap is caused between each log material, and naturally between the bolt portion (20) and the bolt insertion hole (12). In this case, the weight of the log wall is supported only by the clamping bolt (2), and it is feared that the clamping bolt (2) may be buckled.

In order to prevent this buckling, the means of relative preventions are now explained in accordance with FIG. 10–FIG. 13.

Figure 10:
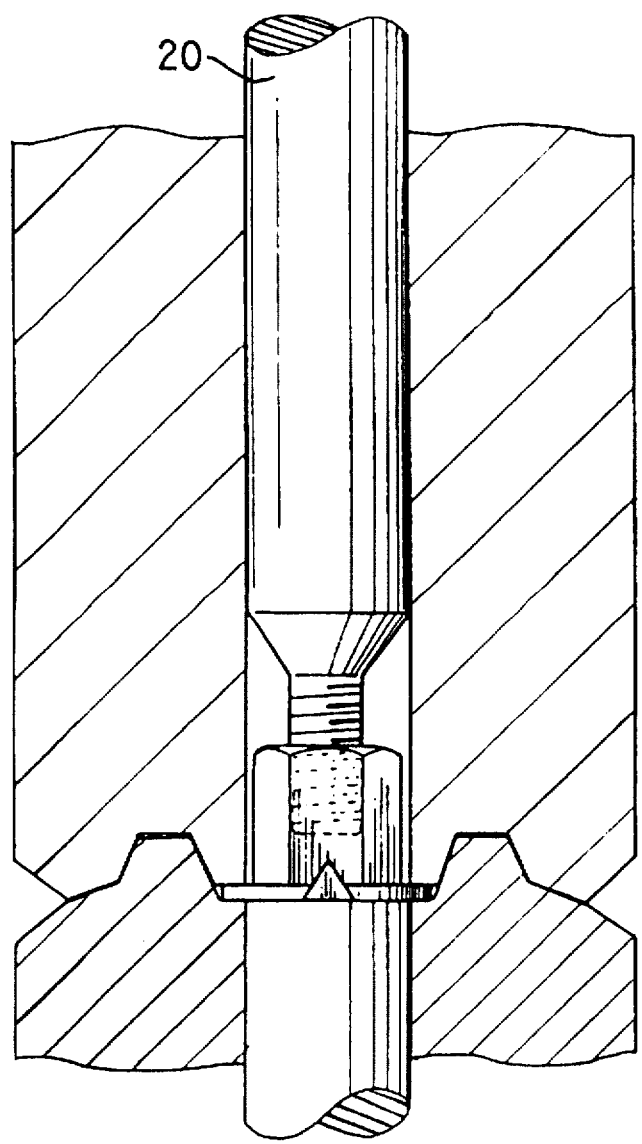
FIG. 10 is a perspective view to show a means to prevent the clamping bolt from being buckled.

With reference to FIG. 10, the diameter of the bolt portion (20) in the clamping bolt (2) is made almost in the same size with that of the bolt insertion hole (12), so that the outer circumference of the bolt portion (20) may tightly contact on the inner circumference of the bolt insertion hole (12). In other words, by this contact, the gap is now eliminated to prevent the bolt (2) from being buckled.

Figure 11:
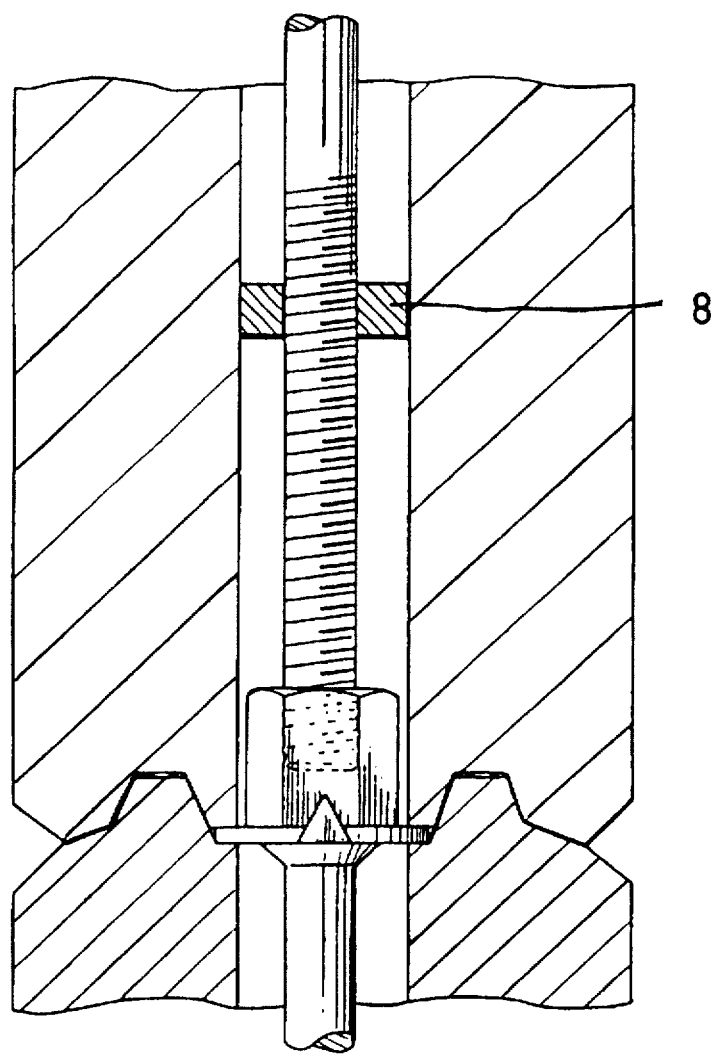
FIG. 11 is a sectional view to show the other means to prevent the bolt from being buckled.

Referring to FIG. 11, a prevention plate (8) is now mounted around the bolt portion (20), the outer diameter of the prevention plate (8) is almost equal to the inner diameter of the bolt insertion hole (12), whereas the gap is eliminated to prevent the clamping bolt (2) from being buckled.

Figure 12:
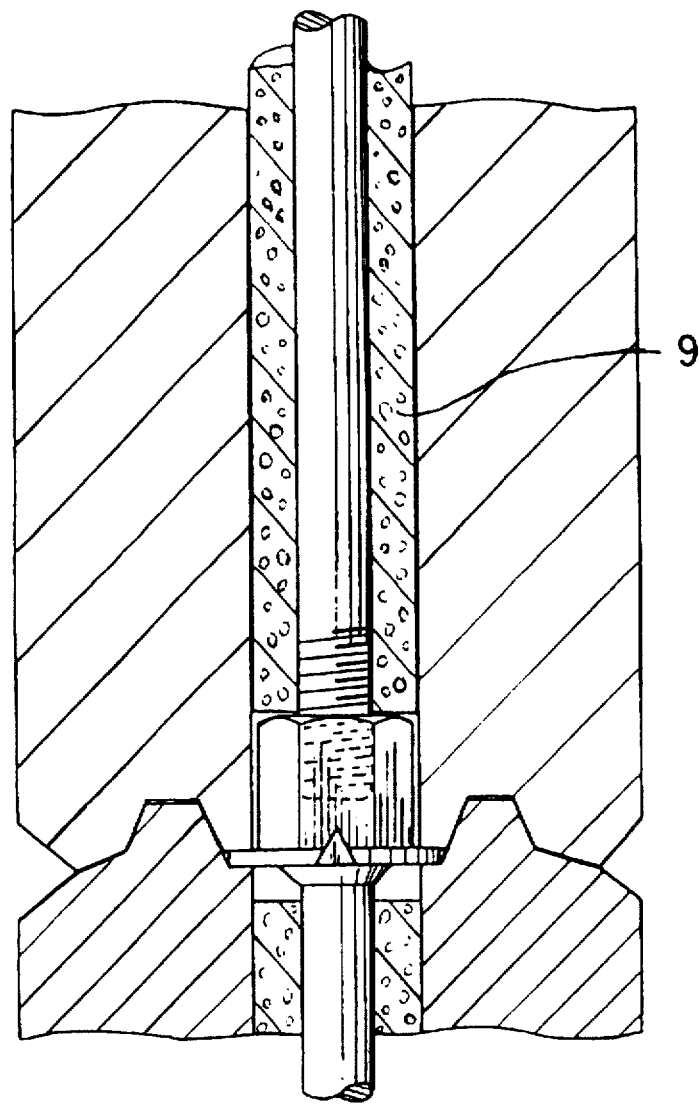
FIG. 12 is a sectional view to show cylindrical pad to prevent the bolt from being buckled.
Figure 13:
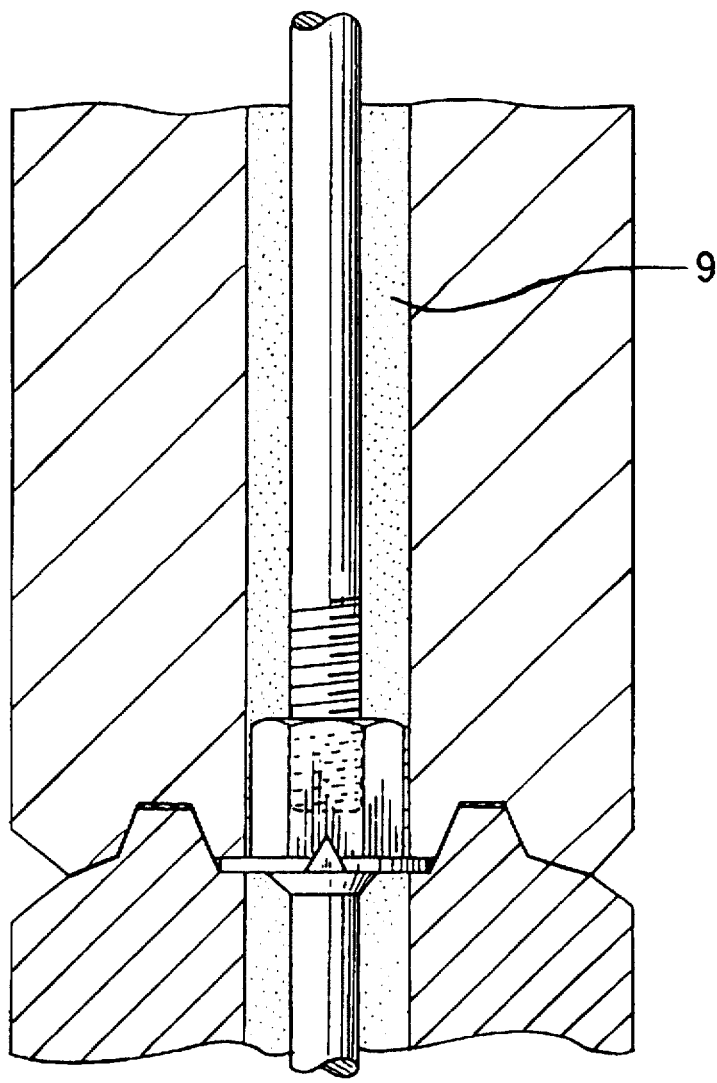
FIG. 13 is a sectional view to show a means to prevent the bolt from being buckled with a filler of sand.

According to FIG. 12 and FIG. 13, a filler (9) is supplied in the gap between the bolt portion (20) and the bolt insertion hole (12), and the gap is eliminated with the filler (9) to prevent the clamping bolt from being buckled. In FIG. 12, the filler (9) is sand while in FIG. 13 the filler is cylindrical pad. With regard to the filler (9) this invention adopts sand or cylindrical pad, but any material which is equipped with the required strength can be used as a filler.

As an advantage of the present log house developed by this invention, it is quite simple and proper to disassemble the log house. In the log house, it is sometimes necessary to disassemble the log materials one by one easily. According to the instant invention, a single clamping bolt is adopted for a single log material, and therefore it is quite a simple work to unscrew the clamping bolt each by each for the log material so that disassembling is effectively performed. At the same time, the claw (24 and 54) pierces into the log material, which ensures to prevent the synchronous rotation of the other bolts in the lower section.

This invention limits the effects of accumulated log shrinkage in a log wall to the amount of shrinkage occuring in the single log installed first at the base of a log wall. Thus the invention achieves the minimum ratio value of the imposed shrinkage thereof.

It is further understood by those skilled in the art that the foregoing description is a preferred embodiment of the disclosed method and device and that various changes and modifications may be made in the invention without departing from the spirit and scope thereof.

What is claimed is:

1. A method of assembling log walls for a log house wherein a base log material is held to a base with a coach bolt and succeeding logs are piled up in turn with clamping bolts, comprising the steps of:

providing a coach bolt having a height corresponding with that of said base log material;

providing clamping bolts having a height corresponding to respective succeeding logs;

providing the coach bolt with an additional threaded wood screw at at its bottom part for respective succeeding logs;

providing on a top part of said coach and said clamping bolts, a nut portion built with a thread to accept the bolt portion of a clamping bolt normal screw;

providing as one body a washer between the bolt portion and the nut portion on said carriage bolt and on said clamping bolt;

drilling a bolt insertion hole through the respective succeeding logs into which the bolts are to be inserted;

screwing the clamping bolt portions used in the respective succeeding logs into the nut portions used in lower succeeding bolts for continual coupling the respective succeeding log material; and wherein each of said washers presses down on a log beneath it.

2. The method according to claim 1, further comprising the step of furnishing between each succeeding log a sealing tape, and extending a caulking compound thereover, wherein when the bolt is tightly screwed to clamp the log material, the sealing tape is forcibly compressed to seal a space between the logs.

3. The method according to claim 1, further comprising the step of providing the gap between the bolt portion and the bolt insertion hole with a means for preventing the bolt from being buckled.

4. The method according to claim 3, further comprising the step of providing the bolt with a preventing means which comprises by supplying the bolt with a diameter which fits tightly into the bolt insertion hole in the log.

5. The method according to claim 3, further comprising providing a filler in a gap between said bolt and said insertion hole.

6. The method according to claim 5, wherein said filler is sand.

7. The method according to claim 5, where said filler is a cylindrical pad.

8. The method according to claim 3, further comprising the step of providing a prevention plate mounted around a portion of said bolt.

9. The method according to claim 1, further comprising the step of establishing a claw in the washer wherein said claw pierces into the log material above it in order to prevent synchronous rotation of the bolt material below the washer when a bolt in the upper material is rotated.

10. A log house clamping bolt, said bolt comprising in the combination:

a bolt length corresponding to the length of a respective single log;

a threaded portion with a normal screw located in a bottom portion of said bolt;

a nut portion built as a single body with the bolt located at the top portion of said bolt;

a washer portion formed between the bolt portion and nut portion;

wherein the threaded portion of said nut is exactly threaded to accept another identical bolt portion.

11. A clamping bolt according to claim 10, wherein a claw is established in said washer to pierce into log material which is placed above said bolt and washer.

12. A bolt according to claim 10, wherein said bolt has a diameter which corresponds with the inner diameter of said bolt insertion hole.

13. A clamping bolt according to claim 10, wherein a plate, having an outer diameter the same as the inner diameter of the bolt insertion hole, is mounted around said bolt portion.

14. A log house coach bolt, said bolt comprising in combination:

a bolt length corresponding to the length of a respective single log;

a threaded portion with a wood screw located in a bottom portion of said bolt;

a nut portion built as a single body with the bolt located at the top portion of said bolt;

a washer portion formed between the bolt portion and nut portion;

wherein said washer has a larger diameter than a bolt insertion hole in a log; and wherein the threaded portion of said nut is exactly threaded to accept an identical thread clamping bolt portion.

15. A coach bolt according to claim 14, wherein a claw is established in said washer to pierce into log material which is placed above said bolt and washer.

16. A coach bolt according to claim 14, wherein said bolt has a diameter which corresponds with the inner diameter of said bolt insertion hole.

17. A coach bolt according to claim 14, wherein a plate, having an outer diameter the same as the inner diameter of the bolt insertion hole, is mounted around said bolt portion.

* * * * *